Jan. 17, 1956 H. A. SHABAKER 2,731,424
SYSTEM FOR CONTACTING SOLIDS AND LIQUIDS
Filed July 10, 1952 3 Sheets-Sheet 2

INVENTOR
Hubert A. Shabaker
BY
ATTORNEY

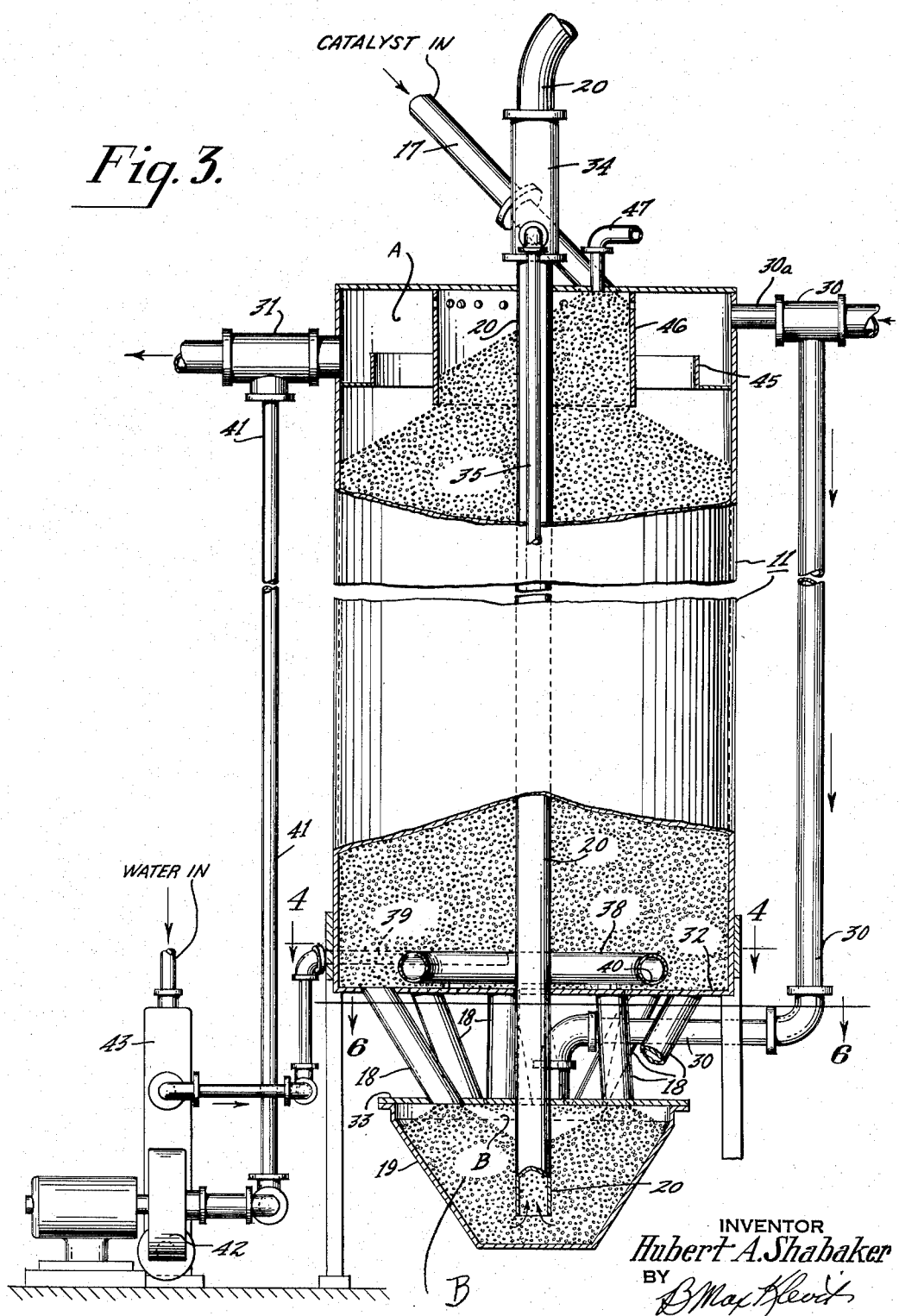

United States Patent Office 2,731,424
Patented Jan. 17, 1956

2,731,424

SYSTEM FOR CONTACTING SOLIDS AND LIQUIDS

Hubert A. Shabaker, Media, Pa., assignor to Houdry Process Corporation, Wilmington, Del., a corporation of Delaware Application July 10, 1952, Serial No. 298,154

15 Claims. (Cl. 252—450)

This invention relates generally to transportation and contacting of granular solids and is chiefly concerned with a method and apparatus for contacting granular solids with liquid in which the contact liquid is utilized in part as the transporting fluid.

In the contacting of granular solid materials with liquid, it is often desirable to transport such solids from one contacting zone to another to effect a desired treatment which may be a washing, leaching or catalyst regeneration treatment. Mechanical conveyors have been employed for this purpose, but they possess disadvantages of mechanical failure and difficulty of coordinating the conveying rate with the capacity of contacting apparatus. Additionally, where corrosive liquids are employed, mechanical conveyors are often unsatisfactory due to corrosion of metallic parts thereof. It is desirable, therefore, in liquid contact systems to employ a granular solid transportation system which employs a liquid as a transporting medium.

The method and apparatus of the present invention is generally adapted for use in the treatment of granular clay materials used in the preparation of catalysts. It has heretofore been proposed to employ as contact masses in catalytic conversions of hydrocarbons certain naturally occurring earths and clays. It has further been proposed to chemically treat such earths and clays to increase their effectiveness and to maintain high catalytic activity in the hydrocarbon conversion processes. Such processes for treating the catalytic clays are described, for example, in U. S. Patents 2,466,048 and 2,466,052 wherein certain natural aluminum containing clays are subjected to contact with sulfur containing materials and thereafter leached with dilute mineral acids. The method and apparatus of the present invention finds particular use in the treatment of such clay materials. Thus, the contacting and transportation system of the present invention may be employed for the treatment of such sulfided clays with dilute hydrochloric acid. It is further contemplated that the method and apparatus of the present invention may be used in other contacting operations such as acid activation, regeneration and washing of granular catalytic materials, and treatment, leaching and washing of ores and other granular particles.

In accordance with the present invention, granular solids are passed in a compact bed downwardly by gravity through a contact zone and into a confined zone positioned beneath the aforementioned contact zone. Contact liquid is passed into the confined zone and passed upwardly through the downwardly-moving granules within the contact zone. The granules gravitating to the bottom of the confined zone are elevated therefrom, being suspended in a portion of the contact liquid exhausted by an eductor. The solids and elevating liquid are then passed into a second contact zone and gravitate therethrough as a compact bed. The contact liquid is passed downwardly through the downwardly gravitating bed at a higher velocity than the velocity of the particles. The solids are drawn from the bottom of the second contact zone into a confined zone and elevated therefrom as described above and then passed to further contacting zones.

Thus, countercurrent contacting is effected in the first contact zone and concurrent contacting takes place in the second zone. Additional concurrent contacting zones preferably are provided. The contact liquid may be rapidly recirculated through the concurrent zones to contact the downwardly moving granules several times in their descent through any given concurrent zone. Thereafter, the solids may be passed through one or more countercurrent zones for further contact with liquid. In particular applications, the first countercurrent zone and the succeeding concurrent zones may be used for acid leaching of granules while washing of the leached particles takes place in the subsequent countercurrent zones.

The principles involved in the present invention are set forth in detail below in connection with the description of the drawings in which various preferred embodiments of the present invention are shown. It is to be understood that these preferred embodiments are to be regarded as illustrating the present invention, rather than as restricting its scope. In the drawings:

Fig. 3 is a side view of a contacting chamber forming part of my invention with portions of the chamber broken away for a better view of the relationship of the parts;

Figure 1:
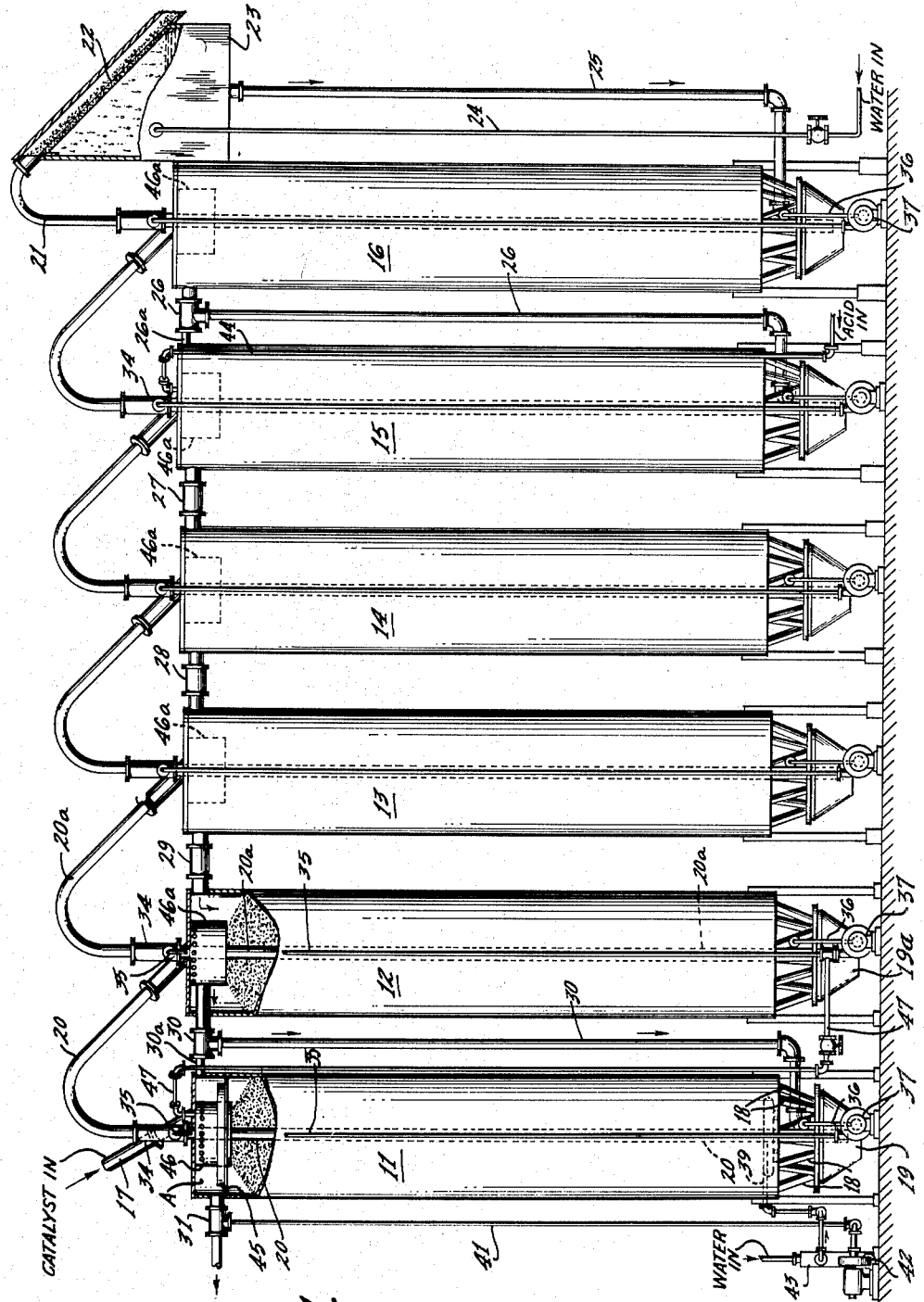
Fig. 1 is a view in elevation of a series of contacting chambers comprising part of the present invention.
Figure 2:
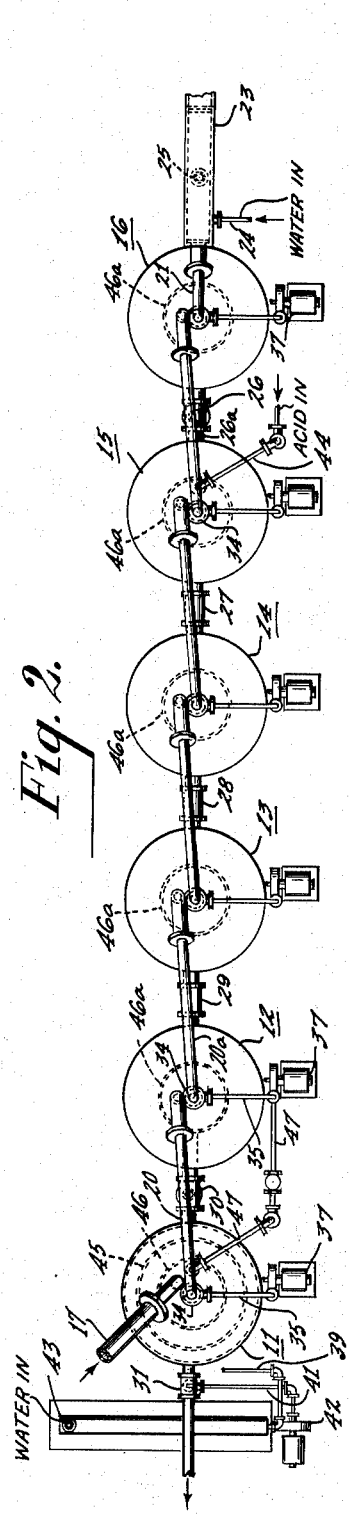
Fig. 2 is a top view of the contacting chambers shown in Fig. 1.

Shown in Figures 1 and 2 is a series of contacting chambers 11, 12, 13, 14, 15 and 16. Granular contact material enters chamber 11 at 17 and gravitates downwardly therethrough as a compact moving bed. From the bottom of chamber 11 the granular solids pass through pipes 18 to a confined chamber 19 positioned below. The solids are then elevated through pipe 20 in a manner to be fully described hereafter and pass into the top of chamber 12. The granular material gravitates as a compact bed through chamber 12 to confined chamber 19a from which is elevated through pipe 20a, to the top of chamber 13. The contact material passes through remaining chambers 13, 14, 15 and 16, in a similar fashion, being elevated from the confined chamber positioned beneath each contact chamber through the vertical pipes to the next succeeding chamber. The granular solids passing through chamber 16 are carried up pipe 21 and onto a screen 22 located above a drain tank 23.

A shown in Fig. 3, the granular solids entering chamber 11 through pipe 17 assume their free angle of repose within the chamber, leaving a solids-free space at the top of the chamber. This free space is generally indicated at A. As a further assurance against the solids entering the connecting pipes 30a and 31, suitable baffles 45 and 46 are provided adjacent the pipes 30a and 31, respectively. A solids-free space is likewise provided at the top of each of chambers 12—16, similarly provided with baffles 46a.

As is apparent also from Fig. 3, the solids assume their free angle of repose within the confined chambers 19 (and 19a), leaving a solids-free space indicated at B.

Referring to Figs. 1 and 3, contact liquid enters drain tank 23 through conduit 24 and is thereafter carried to the solids-free space within the confined chamber positioned beneath chamber 16 by pipe 25. The liquid flows upwardly through chamber 16, out through pipe 26 to the confined chamber positioned below chamber 15. The liquid is passed upwardly through chamber 15, out pipe 27 to the top of chamber 14 and thence through pipes 28 and 29 to chambers 13 and 12 respectively. The liquid from chamber 12 passes through pipe 30 to the solids-free space within confined chamber 19, upwardly through contact chamber 11 and out pipe 31 to waste. The chambers 11—16 are progressively elevated from left to right so that the liquid will flow from chamber 16 to chamber 11 without pumping.

The solid material and the contacting liquid are generally in countercurrent flow relationship. Thus, the granular solids pass from left to right while the contacting liquid flows from right to left in Figs. 1 and 2. Within the contacting chambers themselves, the liquid and solids are in countercurrent flow relationship in chambers 11, 15 and 16 and in generally concurrent flow in chambers 12, 13 and 14.

It is desirable to have the contacting liquid pass through the granular material as forcibly and rapidly as possible. In countercurrent flow such as in chambers 11, 15 and 16, the rate of flow of contact liquid is limited to less than lifting velocity, while in concurrent flow the velocity may be considerably greater. Accordingly, a portion of the liquid entering chamber 14 through pipe 27 flows downwardly therethrough at a higher velocity than the downward velocity of the granular solids. The liquid then flows up the lift pipe 20a and into the top of chamber 15. In chamber 15, the liquid immediately passes out of conduit 27 back into chamber 14. Thus, during the time a mass of granules passes from the top of chamber 14 to the bottom thereof, it may be contacted several times by recirculating contact liquid.

The condition of rapidly circulating contact liquid moving downwardly through the contact chamber at a higher velocity than the downward movement of the granular solids prevails in each of chambers 12, 13 and 14.

As shown in Fig. 1, vent pipes 26a and 30a are provided to permit pressure equalization in chambers 16 and 12, respectively, with the other chambers in the system, and to provide gas vent passages. Such vent pipes have been found desirable to maintain proper flow conditions within the countercurrent contact chambers 11, 15 and 16.

Gases liberated during treatment thus are allowed free movement through the system for collection after passage, with the waste liquid, through pipe 31. Inasmuch as these gases are predominately H₂S liberated through the action of the acid on the sulfided clay, it is desirable both economically and for the abatement of obnoxious fumes in the atmosphere to collect these gases in any suitable manner, not shown.

Figure 4:
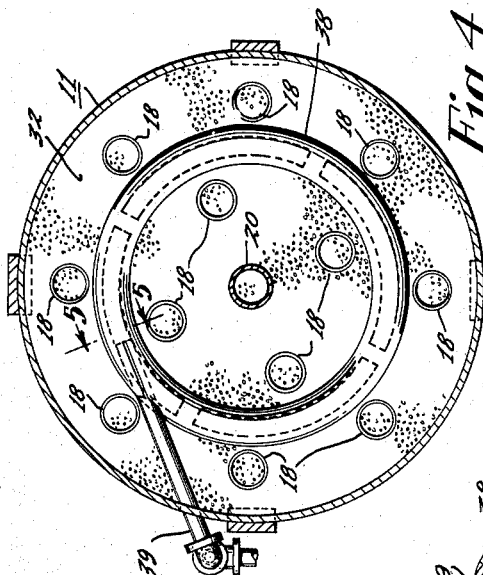
Fig. 4 is a cross-sectional view taken along line 4—4 of Fig. 3.
Figure 6:
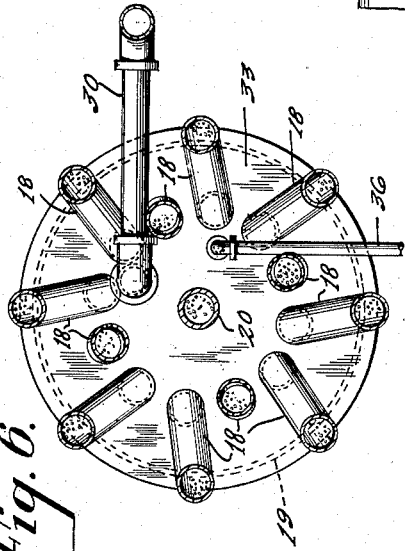
Fig. 6 is a cross-sectional view taken along line 6—6 of Fig. 3.

The details of the confined chamber positioned beneath the contacting chamber and the accompanying solids transportation system are shown in Figs. 3, 4 and 6. A plurality of pipes 18 connect the bottom 32 of chamber 11 to the top 33 chamber 19. The upper ends of pipes 18 are uniformly spaced over the cross-section of the bottom 32 as by being arranged in generally circular fashion in two concentric circles at the bottom 32 of chamber 11 as shown in Fig. 4. The lower ends of the pipes 18 are arranged in generally circular fashion around the top 33 of chamber 19, as shown in Fig. 6. The outer concentric circle of pipe ends connected to the bottom 32 is larger in diameter than the circle of pipes connected to top 33, while the inner circle of pipe ends connected to bottom 32 may be smaller in diameter than the circle of pipe ends connected to top 33. This arrangement including the upper end of the pipes 18 uniformly spaced over the bottom of the chamber assures uniform withdrawal of solids from the chamber, hence uniform movement of solids through the chamber and uniform contacting therein. The lower ends of the pipes 18 terminating in a single circle as shown assures the maintenance of the solids-free space B within the confined chamber due to the free angle of repose of the granular solids.

The solids carried by gravity through the pipes 18 form a compact bed in chamber 19 having the solids-free space B at the top of the chamber. Solids transporting pipe 20 extends from a point adjacent the bottom of chamber 19 up through chamber 11 as shown in Fig. 3. An eductor 34 is positioned in pipe 20. A pipe 35 supplies the high pressure liquid required to effect aspiration by the eductor in a well-known manner, and the resultant reduced pressure in pipe 20 cause liquid from chamber 19 to be carried upwardly through pipe 20. The liquid moves upwardly with such velocity that granular particles are carried with it from chamber 19 and into the next succeeding contact chamber.

While the embodiment shown and described utilizes a confined chamber 19 as the region in which solids from one contacting chamber are collected for transportation into the next succeeding contacting chamber, or for removal from the system, it is to be understood that the solids may be transferred from other types of regions. Thus, the solids may be collected for removal at and from the lower end of the contacting chamber or the collection for removal may be made in other suitable location or apparatus.

As shown in Figs. 1 and 2, the high pressure liquid for actuating the eductor may be drawn from chamber 19 through pipe 36 to pump 37 and thereafter through pipe 35 to the eductor 34. The pipe 36 enters confined chamber 19 at the solids-free space B so liquid alone is pumped. It may be desirable, however, to employ liquid from other sources within the system for use as the high pressure fluid for actuating the eductor.

In many applications involving liquid contact with solids, particularly where chemical reactions take place heat is evolved. Thus, in the leaching of sulfided clay catalyst with mineral acids, the heat of reaction and the heat of wetting materially increases the temperature in the contact chambers. It is desirable, therefore, to provide cooling means in one or more of the contact chambers.

Figure 5:
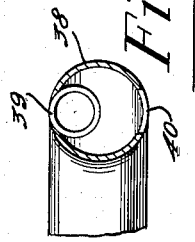
Fig. 5 is a cross-sectional view taken along line 5—5 of Fig. 4.

One form of cooling means is shown in detail in Figs. 3, 4 and 5. A cooling liquid distributing ring 38 is positioned adjacent the bottom of chamber 11. Cool liquid is delivered to the ring 38 by a tangential inlet 39. As shown in Figs. 4 and 5, the ring has apertures 40 around the bottom thereof to permit the flow of cooling liquid directly into contact with the contact mass.

The cooling liquid is derived from the effluent liquid leaving through outlet 31 as shown in detail in Fig. 3. A portion of the waste from outlet 31 may be bled off through pipe 41, through pump 42, cooler 43 and thence to the cooling liquid distributing ring 38. Within the tank 11, therefore, there is continuous recirculation of treating liquid.

In a preferred embodiment of the present invention sulfided clay granules may be leached and washed in the system shown in Figs. 1 and 2. The clay granules enter at 17 and pass successively through chambers 11—16. Hydrochloric acid enters the system through pipe 44 at the top of chamber 15 and passes out through pipe 27 to chamber 14. In chambers 12, 13 and 14, the granules are subjected to concurrent leaching with acid in the manner described above. The amount of acid overflowing from chamber 14 to chamber 13 through pipe 28 is substantially equal to the amount of acid added through line 44. This prevails also in chambers 12 and 13.

The clay granules are subjected to countercurrent leaching in chamber 11. To assure better leaching in chamber 11, I may introduce fresher acid to the top of chamber 11 for initially contacting the fresh clay granules. Thus, there is provided a pipe 47 extending from the confined chamber below chamber 12 to the top of chamber 11. The unleached particles entering through pipe 17 are first contacted with acid having the composition and strength of the acid existing at the bottom of chamber 12, rather than with the weaker acid at the top of chamber 11 and going to waste through pipe 31.

Cooling in chamber 11 is provided to prevent excessive rise of temperature within the system due to the heats of reaction and of wetting as previously described.

Countercurrent washing of the leached clay takes place in chambers 15 and 16. The leached and washed granules are drained of wash water on screen 22 and thereafter passed to suitable drying apparatus (not shown).

It will be apparent that for particular contacting operations, more or fewer chambers may be employed than the number shown. Likewise, the sequence of countercurrent and concurrent stages may be varied for effective contacting in other operations.

The method and apparatus described herein thus provides a truly continuous system for contacting granular solids with liquid.

Obviously, many modifications and variations of the invention as hereinbefore set forth may be made without departing from the spirit and scope thereof and, therefore, only such limitations should be imposed as are indicated in the appended claims.

I claim as my invention:

1. In a method for contacting granular solids with liquid, wherein said solids are passed sequentially through a horizontal series of confined contact zones having progressively higher liquid levels while contact liquid is passed in reverse sequence through said series by gravity overflow between said zones, the steps of: passing said solids downwardly by gravity flow as a compact bed through the first of said contact zones and from the bottom thereof into a separate lower confined zone positioned beneath said first contact zone, introducing said contact liquid into said lower confined zone and then upwardly through said first contact zone at a velocity insufficient to effect substantial lifting of said solids, elevating said solids by means of a confined rising stream of liquid from said lower confined zone to the top of the second contact zone, passing said solids downwardly by gravity flow as a compact bed through said second contact zone while contacting said solids with said contact liquid, removing said solids from the bottom of said second contact zone, and removing said contact liquid from the top of said first contact zone.

2. The method set forth in claim 1 wherein a portion of the liquid from said confined lower zone is used to elevate said solids from said lower confined zone to the top of said second contact zone.

3. The method set forth in claim 1 wherein said solids are passed from said second contact zone downwardly by gravity to a second confined zone therebelow, and thereafter elevated by means of a confined rising stream of liquid from said second confined zone to the top of a third contact zone.

4. The method set forth in claim 1 wherein contact liquid is passed downwardly through said second contact zone at a velocity higher than the downward velocity of said solids in said second contact zone.

5. In a method for contacting granular solids with liquid, wherein said solids are passed sequentially through a horizontal series of confined contact zones having progressively higher liquid levels while contact liquid is passed in reverse sequence through said series by gravity overflow between said zones, the steps of: passing said solids in a compact bed downwardly by gravity through a first contact zone and into a confined zone positioned beneath said first zone, passing said liquid upwardly through a second contact zone and from the top of said second zone through said confined zone and upwardly through said first zone, elevating said solids from said confined zone to the top of said second zone by liquid means, passing said solids in a compact bed downwardly by gravity through said second zone, removing said solids from the bottom of said second zone and removing said liquid from the top of said first zone.

6. The method set forth in claim 5 wherein said solids as initially admitted to said first contact zone contains residual acid from a preceding acid treating operation and said liquid passed through said second contact zone serves to wash out acid from said solids.

7. In a method for acid-leaching granular clay particles wherein said particles are passed sequentially through a horizontal series of confined acid-leaching zones having progressively higher liquid levels while liquid is passed in reverse sequence through said series by gravity overflow between said zones, the steps of: passing said particles in a compact bed downwardly by gravity through an acid leaching zone and into a confined zone positioned beneath said acid leaching zone, passing acid leach liquor into said confined zone and upwardly through said acid leaching zone, elevating said particles from said confined zone to the top of a second acid leaching zone by liquid means, passing said particles in a compact bed downwardly by gravity through said second acid leaching zone, passing acid leach liquor downwardly through said second acid leaching zone and thereafter washing said particles with an aqueous wash liquor.

8. The method set forth in claim 7 wherein said particles are countercurrently washed with an aqueous wash liquor.

9. The method set forth in claim 7 wherein said acid leach liquor is passed downwardly through said second acid leaching zone at a higher velocity than the downward velocity of said particles in said second acid leaching zone.

10. The method set forth in claim 7 wherein said particles are passed from said second acid leaching zone downwardly by gravity to a second confined zone and thereafter elevated therefrom by liquid means to the top of a third acid leaching zone.

11. The method set forth in claim 7 wherein a portion of the acid leach liquor from said confined zone is used to elevate said solids from said confined zone to the top of said second acid leaching zone.

12. In a method for contacting granular solids with liquid, wherein said solids are passed sequentially through a horizontal series of confined contact zones having progressively higher liquid levels while contact liquid is passed in reverse sequence through said series by gravity overflow between said zones, the steps of: passing said solids in a compact bed downwardly through a first contact zone, passing a first contact liquid upwardly through said first contact zone, passing said solids from said first contact zone downwardly through at least one intermediate contact zone, passing said first contact liquid downwardly through said intermediate contact zone at a higher velocity than the downward velocity of said solids and recirculating the liquid therethrough, passing said solids from said intermediate contact zone downwardly through a final contact zone and passing a second contact liquid upwardly through said final contact zone.

13. Apparatus for countercurrently contacting granular solids and a liquid comprising a first contact chamber, a confined chamber positioned beneath said first contact chamber, a second contact chamber laterally adjacent to said first contact chamber, conduit means for conveying overflow liquid by force of gravity from said second contact chamber to said first contact chamber, means for admitting liquid to said confined chamber, means for admitting solids to the top of said first contact chamber, a conduit extending from said confined chamber to the top of said second chamber, liquid eductor means in said conduit for impelling solids from said confined chamber through said conduit to the top of said second chamber, means for removing liquid from the top of said first chamber and means for removing solids from the bottom of said second chamber.

14. The apparatus as set forth in claim 13 including a second confined chamber positioned beneath said second contact chamber, a second conduit extending upwardly from said second confined chamber and liquid eductor means in said second conduit for impelling solids from said second confined chamber.

15. The apparatus as set forth in claim 13 wherein liquid cooling means is positioned within said first contact chamber and adjacent the bottom thereof.

References Cited in the file of this patent

UNITED STATES PATENTS

| | | |
|---|---|---|
| 2,112,805 | Bonotto | Mar. 29, 1938 |
| 2,391,434 | McAfee | Dec. 25, 1945 |
| 2,434,602 | Thompson | Jan. 13, 1948 |
| 2,449,622 | Roetheli | Sept. 21, 1948 |
| 2,503,013 | Watson | Apr. 4, 1950 |
| 2,574,106 | Jones Jr. | Nov. 6, 1951 |